(12) United States Patent
Kugelberg et al.

(10) Patent No.: US 7,340,978 B2
(45) Date of Patent: Mar. 11, 2008

(54) METHOD AND APPARATUS FOR MAKING A ROTARY TOOL FOR CHIP REMOVING MACHINING

(75) Inventors: Jören Kugelberg, Huddinge (SE);
Roine Ericsson, Huddinge (SE);
Jonathan Fair, Coventry (GB); Anders Micski, Huddinge (SE)

(73) Assignee: Sandvik Intellectual Property AB, Sandviken (SE)

( * ) Notice: Subject to any disclaimer, the term of this patent is extended or adjusted under 35 U.S.C. 154(b) by 308 days.

(21) Appl. No.: 10/882,385

(22) Filed: Jul. 2, 2004

(65) Prior Publication Data
US 2005/0031423 A1   Feb. 10, 2005

(30) Foreign Application Priority Data
Jul. 28, 2003   (SE) .................................... 0302135
Dec. 23, 2003   (SE) .................................... 0303520

(51) Int. Cl.
*B21C 25/00*   (2006.01)
*B23B 51/02*   (2006.01)

(52) U.S. Cl. .................. 76/108.6; 29/557; 72/254; 72/338; 425/381; 470/10; 470/16; 470/66

(58) Field of Classification Search .............. 76/108.6; 425/380, 381; 408/144, 227–230; 470/10, 470/16, 66; 29/557; 72/254, 255, 338, 340, 72/347; 75/241
See application file for complete search history.

(56) References Cited

U.S. PATENT DOCUMENTS

| | | | |
|---|---|---|---|
| 2,989,777 A * | 6/1961 | Bailey, Jr. .................... 264/121 |
| 3,002,615 A * | 10/1961 | Lemelson .................... 72/17.1 |
| 3,874,207 A * | 4/1975 | Lemelson ....................... 72/56 |
| 4,704,055 A * | 11/1987 | Guhring ........................ 408/59 |
| 4,779,440 A | 10/1988 | Cleve et al. |
| 4,826,364 A * | 5/1989 | Grunsky ........................ 408/59 |
| 5,116,659 A | 5/1992 | Glatzle et al. |
| 5,438,858 A | 8/1995 | Friedrichs |
| 5,780,063 A * | 7/1998 | Friedrichs ................. 425/131.1 |

(Continued)

FOREIGN PATENT DOCUMENTS

EP   1 075 885   2/2001

(Continued)

*Primary Examiner*—Boyer D. Ashley
*Assistant Examiner*—Edward Landrum
(74) *Attorney, Agent, or Firm*—Drinker Biddle & Reath LLP

(57) ABSTRACT

A method for manufacturing a rotary tool for chip removing machining with at least one chip flute that extends in the longitudinal direction of the tool. The method involves preparing a mixture of a cemented carbide, cermet or ceramics powder and a carrier, such as a polymer, and placing the mixture in an extruding machine. The mixture is extruded in a feed direction by means of a die to form the diameter of the mixture body. The mixture body passes against a chisel which forms a chip flute in the outer periphery of the mixture body by chip-removing machining. When the chisel is displaced away from the mixture body, a non-fluted shaft portion is formed. By rotating the mixture body while contacted by the chisel, a helical chip flute can be formed. Alternatively, the body could be twisted after a straight flute has been formed, whereupon the flute becomes helical.

8 Claims, 1 Drawing Sheet

U.S. PATENT DOCUMENTS

| | | | |
|---|---|---|---|
| 6,450,739 B1 * | 9/2002 | Puide et al. | 408/144 |
| 6,669,414 B1 * | 12/2003 | Puide et al. | 408/144 |
| 7,101,167 B2 * | 9/2006 | Puide et al. | 425/381 |
| 2002/0130434 A1 * | 9/2002 | Rigali et al. | 264/171.13 |

FOREIGN PATENT DOCUMENTS

| | | |
|---|---|---|
| JP | 11-226810 | 8/1999 |
| WO | WO 00/74870 | 12/2000 |

* cited by examiner

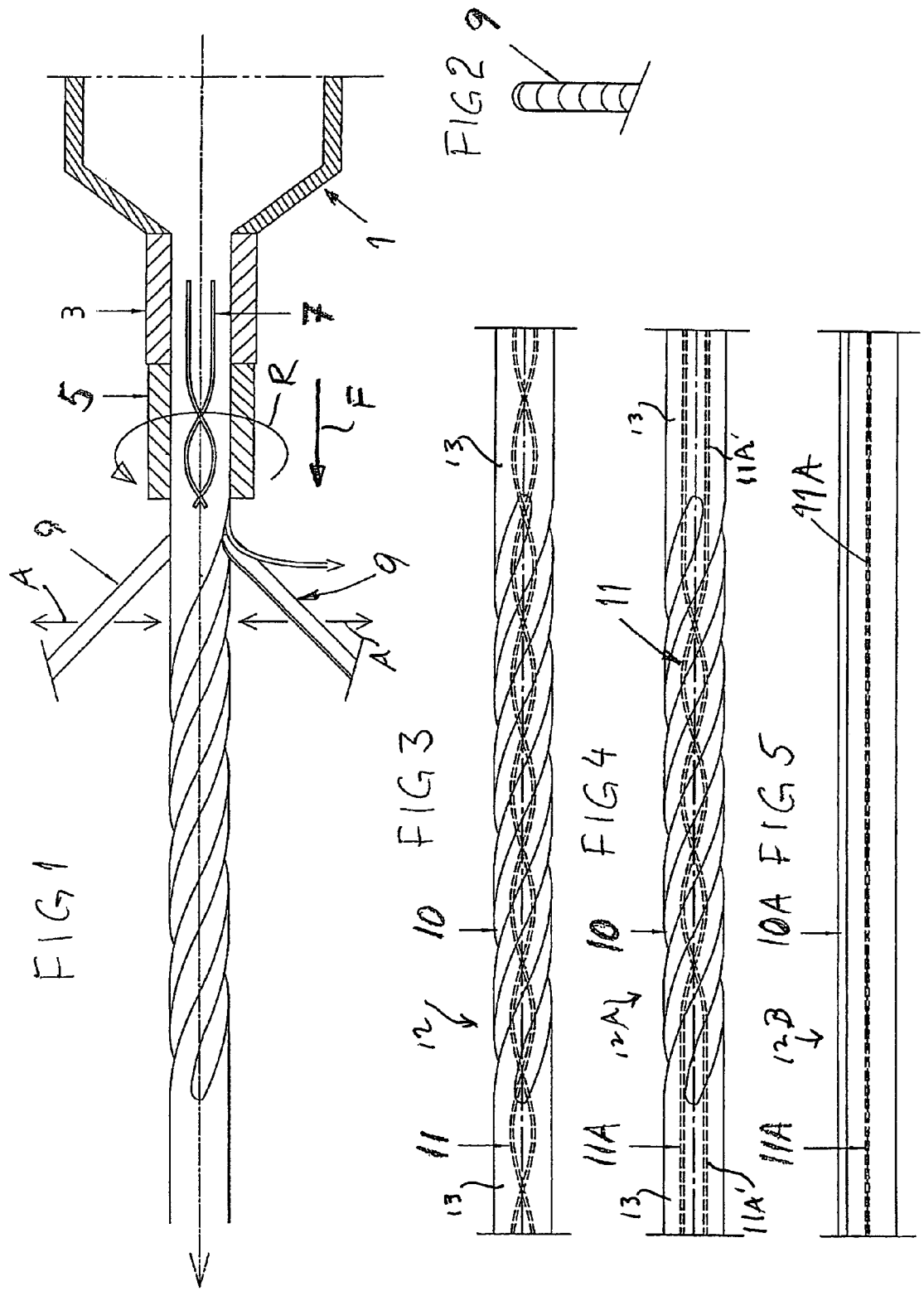

METHOD AND APPARATUS FOR MAKING A ROTARY TOOL FOR CHIP REMOVING MACHINING

This application claims priority under 35 U.S.C. §§ 119 and/or 365 to patent application Ser. No. SE 0302135-9 and SE 0303520-1 filed in Sweden on Jul. 28, 2003, and Dec. 23, 2003, respectively, the entire contents of which are hereby incorporated by reference.

TECHNICAL FIELD OF THE INVENTION

The present invention relates to a method of making a cemented carbide, cermet or ceramic rotary tool for chip removing machining with at least one helically extending chip flute. The method comprises preparing a mixture of cemented carbide, cermet or ceramic powder and a carrier, pressing the mixture through a nozzle to produce a green body which subsequently is sintered and machined. At least one chip flute is formed in the green body. The invention also relates to a device for carrying out the method according to the present invention and a rotary tool that is manufactured by the method according to the present invention.

PRIOR ART

Tools such as twist drills or end mills are generally manufactured starting from sintered cylindrical blanks in which chip flutes are ground and the ground blank is subsequently brazed to a cylindrical shank to form the finished tool. This is an expensive and time consuming manufacturing route. The problem has partly been solved by injection moulding of hard metal mixed in a carrier such as disclosed in U.S. Pat. No. 4,779,440. An extruded drill blank having chip flutes of constant pitch along the circumference of the blank is obtained by heating a hard metal powder to extrusion temperature, pressing the heated powder through a space defined by a mandrel and a nozzle while rotating the blank. The blank is guided by the extrusion in direction past a helical ridge provided inside of the nozzle, to shape chip flutes along the blank. A drawback of this known technique is that the chip flutes are obtained along the entire length of the blank and after having been cut into suitable length has to be brazed to a shank.

A further solution this problem is disclosed in WO 00/74870 according to which a rotary tool such as a helix drill or an end mill for example, is manufactured by forming a blank by an extrusion process. During the extrusion, a mixture is passed through a die which provides a cylindrical shape to the outer peripheral surface of the mixture. A plurality of jaws are disposed downstream of the die for conducting the mixture. Each jaw includes a helical ridge for engaging the outer surface of the extruded mass to cause a helical groove to be formed therein which constitutes a chip flute in the tool. During the extrusion, the jaws are moved away from the mixture to terminate formation of the chip grooves, whereby a shank portion of the tool is formed. The drawbacks of this method is that the cooling channels may be negatively affected by the formation of the flutes. One set of jaws can only produce one type of flute geometry. If a different pitch is desired a different set of jaws has to be used. The flute channels are formed during twisting.

OBJECTS AND FEATURES OF THE INVENTION

A primary object of the present invention is to provide a method and a device, where the parameters of the chip flutes may easily be varied.

Another object of the present invention is to manufacture the chip flutes in such a way that the previously manufactured structure is not affected.

Still an object of the present invention is to produce a number of different embodiments with the same equipment.

At least the primary object of the present invention is realized by a method for manufacturing a rotary tool for chip removing machining having at least one external chip flute that extends generally in a longitudinal direction of the tool, the method comprising the steps of:

A) preparing a mixture of a cemented carbide, cermet or ceramics powder and a carrier such as a polymer, B) placing the mixture in an extruding machine, C) extruding the mixture in a feed direction through a die forming a diameter of a mixture body, D) allowing the mixture body to exit the die and travel in contact with at least one cutter which forms a chip flute in an outer periphery of the mixture body by chip-removing machining, E) displacing the at least one cutter out of contact with the mixture body so that the mixture body is formed with an unfluted shank portion, F) allowing the mixture body to solidify and form a green body, and G) sintering the green body.

BRIEF DESCRIPTION OF THE DRAWINGS

Below a number of embodiments will be described, reference being made to the accompanying drawings.

FIG. 1 illustrates schematically an embodiment of the method according to the present invention.

FIG. 2 shows a top view of a part of a chisel that is used to perform the method according to the present invention.

FIG. 3 shows a side view of a part of a first rotary tool manufactured by the method according to the present invention, the flush channels being shown by dotted lines.

FIG. 4 shows a side view of a part of a second rotary tool manufactured by the method according to the present invention, the flush channels being shown by dotted lines.

FIG. 5 shows a side view of a part of a third rotary tool manufactured by the method according to the present invention, the flush channels being shown by dotted lines.

DESCRIPTION OF PREFERRED EMBODIMENTS OF THE INVENTION

The present invention thus relates to a method for manufacturing a rotary tool for chip removing machining, said tool having at least one chip flute that extends in the longitudinal direction of the tool. The tool achieved by the method according to the invention may e.g. constitute a helix drill or an end mill.

FIG. 1 shows a section through a portion of an extruding machine for manufacturing elongated green bodies and especially green bodies for rotary tools for chip removing machining. The extruding machine comprises a housing 1 and a die 3 that is integral with the housing 1. A sleeve 5 is connected to the free end of the die 3, said sleeve 5 being selectively rotatable relative to the die 3 about a longitudinal center axis A of the die by any suitable bearing arrangement.

The sleeve 5 is rotated via a variable-speed external power source 5A (not shown). By this arrangement it is possible to vary the rotational speed of the sleeve 5, this being an important feature of the present invention. The direction of rotation of the sleeve 5 is illustrated by the arrow R in FIG. 1.

In the cavity formed by the die 3 and the sleeve 5, two elastic filaments 7 are provided, said filaments 7 having their right ends in FIG. 1 fixed to a component of the die 3, while the left ends of the filaments 7 are free.

In the area of the free end of the rotatable sleeve 5, cutters are provided in the shape of two chisels 9. The chisels 9 are stationary while cutting, but are adjustable in the directions of the arrows A to vary their transverse positions relative to the green body that is fed out of the free end of the rotatable sleeve 5.

The preferred method includes the following steps:

A) preparing a mixture of a cemented carbide, cermet or ceramics powder and a carrier, such as a polymer, B) placing the mixture in the extruding machine schematically shown in FIG. 1, C) extruding the mixture in a feed direction F, see FIG. 1, the mixture passing through and exiting the die 3 which forms the outer diameter of an exiting mixture body, D) allowing the exiting mixture body to pass in contact with the stationary chisels 9 to form external chip flutes in an outer periphery of the mixture by a chip-removing cutting operation, E) displacing the chisels 9 transversely outwards so that a non-fluted shank portion is formed on the mixture body as the body continues to be fed, F) allowing the mixture body to solidify and form a green body, and G) sintering the green body.

The method as defined above is the most general version of the method. Normally, the chip flutes extend helically in the longitudinal direction of the tool. This means that the sleeve 5 is rotated in order to cause the mixture to rotate when leaving the free end of the sleeve 5. As mentioned above, the rotation of the sleeve 5 is effected by an external variable-speed power source, so that the rotational speed of the sleeve 5 may be varied without varying the axial speed of the mixture. Thus, the pitch of the helical chip flutes may be given different values by regulating the rotational speed of the sleeve 5. Normally, the tool has helical chip flutes with a constant pitch, but may be given different pitch values in different segments, by varying the rotational speed of the sleeve 5 during the flute-cutting operation.

Since the mixture may have different compositions, the susceptibility to rotate may vary. This may also be taken care of by varying the rotational speed of the sleeve 5. Different compositions also shrink differently during sintering. Since the shrinkage affects the pitch due consideration to the difference in shrinkage may also be taken by varying the rotational speed of the sleeve 5.

Normally, a tool manufactured by the method according to the present invention is equipped with internal cooling bores that either extend helically along the longitudinal direction of the tool or rectilinear along the longitudinal direction of the tool. The cooling bores are formed by means of the elastic filaments 7 in the manner disclosed for example in U.S. Pat. No. 5,438,858. When the sleeve 5 is rotated relative to the die 3, the filaments 7 follow the torsion of the rotation, i.e. helical cooling bores are produced. When the sleeve 5 is not rotated, rectilinear cooling bores are produced.

The sleeve 5 may be equipped with grooves to improve the rotation of the mixture body that leaves the sleeve 5. In such a case the sintered body is equipped with projecting portions that need to be removed by grinding or the like in a finishing machining. Preferably, the grinding takes place at edge and shank portions, clearance surfaces and flute channels.

Preferably, the cutting operation is performed by at least one movable chisel 9 or similar, such as a mill. In a preferred embodiment the cutting operation is performed by two chisels 9 that are disposed downstream of both the die 3 and the sleeve 5, and the chisels are movable relative to each other in the direction of the arrows A. Each chisel 9 is also movable transversely relative to the mixture body that is subjected to chip removing machining. By a suitable transverse adjustment of the chisel relative to the mixture body, the rotation of the mixture body may either be enhanced or counteracted. The chisels 9 are oriented at an oblique angle relative to the feed direction to avoid disturbing the flute pitch.

The extrusion is preferably performed at room temperature. The chisels can be warmed up in order to facilitate the cutting.

In FIG. 3 an embodiment of a green body 12 is schematically disclosed, said green body being manufactured by the extruding machine according to FIG. 1. As is evident from FIG. 3 the green body comprises alternating portions that either are equipped with chip flutes 10 or void of chip flutes. To produce the portions having chip flutes 10, the chisels 9 are machining the mixture body that leaves the sleeve 5. To produce the portions being void of chip flutes the chisels 9 are displaced outwards in the direction of the arrows A in order to cease machining of the mixture body, i.e. a shaft portion 13 is produced. As is evident from FIG. 3 internal cooling bores 11 extend helically along the entire green body, i.e. the sleeve 5 is rotated during the manufacturing of both the portions that are equipped with chip flutes 10 as well as the portions that are void of chip flutes.

In FIG. 4 an alternative embodiment of a green body 12A is schematically disclosed, said green body being manufactured by the extruding machine according to FIG. 1. The embodiment according to FIG. 4 differs from the embodiment according to FIG. 3 in that the internal cooling bores 11A have segments 11A' that are rectilinear in the shaft portions 13, i.e. the portions being void of chip flutes. This is achieved by not rotating the sleeve 5 when the shaft portions are manufactured.

In FIG. 5 still an alternative embodiment of a green body 12B is disclosed said green body being manufactured by the extruding machine according to FIG. 1. The embodiment according to FIG. 5 differs from the embodiments according to FIGS. 3 and 4 in that the internal cooling bores 11A are rectilinear along the entire length of the green body. Another difference is that the green body according to FIG. 5 is equipped with only one chip flute 10A that extends rectilinear along the entire length of the green body. The green body according to FIG. 5 is achieved by not rotating the sleeve 5 and to use one chisel 9 only.

Generally, to achieve a tool for chip removing machining the green bodies described are sintered and if necessary subjected to a finishing machining, e.g. in the shape of grinding.

FEASIBLE MODIFICATIONS OF THE INVENTION

Normally, the inner side of the sleeve 5 is smooth. However, if the friction between the inner side of the sleeve 5 and the green body is too low to properly impart rotation to the mixture, it is possible that the interior of the sleeve 5 could be equipped with driving means, e.g. grooves that extend helically in the axial direction of the sleeve 5.

In the embodiment of the extruding machine, schematically disclosed in FIG. 1, filaments 7 are provided to produce internal cooling bores. However, within the scope of the present invention it is also possible to use pins or the like. Within the scope of the present invention it is also possible to vary the length of the filaments/pins. If the filaments/pins extend all the way up to the area where the chisels perform chip removing machining of the mixture body, the filaments/pins will perform a supporting action in connection with the chip removing machining that is carried out by the chisels.

The embodiments disclosed above are equipped with internal cooling bores. However, the method according to the present invention can also be used to manufacture rotary tools that are devoid of cooling bores. In such a case the filaments 7 of the extruding machine are deleted.

In an alternative embodiment the flutes are cut in the untwisted extruded mass (i.e., the sleeve 5 would be omitted) to obtain a green body with straight flutes which subsequently is twisted after the flute formation but prior to the solidification of the green body.

Within the scope of the present invention the cross-section of the flutes may vary. In exemplifying and non-restricting purpose a curved cross-section and a V-shaped cross-section may be mentioned.

Although the present invention has been described in connection with preferred embodiments thereof, it will be appreciated by those skilled in the art that modifications, substitutions and deletions not specifically described may be made without departing from the spirit and scope of the invention as described in the appended claims.

What is claimed is:

1. A method for manufacturing a rotary tool for chip removing machining having at least one external chip flute that extends generally in a longitudinal direction of the tool, comprising the steps of:
   A) preparing a mixture of a powder and a carrier, the powder comprising one of cemented carbide, cermet, or ceramics,
   B) placing the mixture in an extruding machine,
   C) extruding the mixture in a feed direction through a die forming a diameter of a mixture body,
   D) allowing the mixture body to exit the die and travel in contact with at least one cutter which forms a chip flute in an outer periphery of the mixture body by removing a portion of the mixture body,
   E) displacing the at least one cutter out of contact with the mixture body so that the mixture body is formed with an unfluted shank portion,
   F) allowing the mixture body to solidify and form a green body, and
   G) sintering the green body.

2. The method according to claim 1 further including, following step G, the step of finish machining the sintered green body.

3. The method according to claim 1 wherein the at least one cutter comprises a chisel.

4. The method according to claim 1 further including the step of forming at least one cooling bore in the mixture body prior to forming the at least one chip flute.

5. The method according to claim 1 wherein step C is performed at room temperature.

6. The method according to claim 1 wherein the mixture body is caused to rotate as it exits the die.

7. The method according to claim 6 wherein the cutter extends at an oblique angle relative to the feed direction.

8. The method according to claim 1 wherein steps C and D are performed without rotating the mixture body wherein straight flutes are formed; and further comprising twisting the mixture body prior to step F.

* * * * *